United States Patent
Hutchin (10) Patent No.: US 10,215,833 B1
(45) Date of Patent: Feb. 26, 2019

(54) TWO-AXIS INTERFEROMETRIC TRACKING UTILIZING PAIRS OF SHEARING INTERFEROMETERS

(71) Applicant: Optical Physics Company, Simi Valley, CA (US)

(72) Inventor: Richard A. Hutchin, Reno, NV (US)

(73) Assignee: Optical Physics Company

( * ) Notice: Subject to any disclaimer, the term of this patent is extended or adjusted under 35 U.S.C. 154(b) by 0 days.

(21) Appl. No.: 15/863,214

(22) Filed: Jan. 5, 2018

(51) Int. Cl.
G01J 9/02 (2006.01)
G01S 3/786 (2006.01)
G01S 17/66 (2006.01)

(52) U.S. Cl.
CPC ............ *G01S 3/786* (2013.01); *G01J 9/0215* (2013.01); *G01S 17/66* (2013.01)

(58) Field of Classification Search
CPC ......... G01S 3/786; G01S 17/66; G01J 9/0215
See application file for complete search history.

(56) References Cited

U.S. PATENT DOCUMENTS

| 4,626,100 | A | 12/1986 | Johnson |
| 8,045,178 | B2 | 10/2011 | Hutchin |
| 8,358,400 | B2 | 1/2013 | Escuti |
| 9,297,880 | B2 | 3/2016 | Hutchin |
| 2005/0278126 | A1 | 12/2005 | Rosakis et al. |
| 2010/0002242 | A1 | 1/2010 | Hutchin |
| 2012/0188467 | A1 | 7/2012 | Escuti et al. |

OTHER PUBLICATIONS

Partial European Search Report for EP 14168693 dated Jun. 8, 2015. EP.

*Primary Examiner* — Hwa Andrew Lee
(74) *Attorney, Agent, or Firm* — The Belles Group, P.C.

(57) ABSTRACT

An interferometric tracking device including: an optical cascade comprising a plurality of image dividers, each of the image dividers splitting incident light into a plurality of non-parallel orthogonally polarized beams, the plurality of image dividers including: an incident image divider receiving light into the optical cascade; one or more intermediary image dividers optically coupled to the incident image divider; and one or more exit image dividers, each exit image divider optically coupled to one of the intermediary image dividers; a plurality of pairs of shearing interferometers, each pair of the shearing interferometers being optically coupled between optically adjacent image dividers in the optical cascade; and one or more focal plane arrays, the orthogonally polarized beams from the one or more exit image dividers being imaged onto the one or more focal plane arrays.

26 Claims, 8 Drawing Sheets

TWO-AXIS INTERFEROMETRIC TRACKING UTILIZING PAIRS OF SHEARING INTERFEROMETERS

FIELD OF THE INVENTION

The field of the present invention is optical tracking devices, particularly optical tracking devices that are used to determine the position and trajectory of a light source by measuring the axial direction of beams of light from that light source.

BACKGROUND OF THE INVENTION

Optical tracking is a general purpose tool that can be used as an enabling technology in a broad range of applications. One example is determining the axial direction of a laser beam. For example, a suitably accurate optical tracker could be incorporated into a surface scanning device which, by sending out a laser beam towards a surface with unknown orientation and measuring the reflected beam's axial direction, determines the surface orientation with respect to the scanning device. Measuring multiple surface orientations in this manner also provides information about the relative orientation of these multiple surfaces or surface segments, and thus generates a contour map.

Optical tracking devices can also be used aboard stationary or moving platforms to determine their position or orientation with respect to one or more light sources. One example application is a ground based observation station which is tasked with tracking spacecraft in Earth orbit. An optical tracking device is required to measure and track the axial direction of light coming from one or more such spacecraft. This light can be reflected sunlight, reflected laser light, or light originating from the spacecraft itself. A second example is an airborne reconnaissance platform tasked with tracking moving ground vehicles. The light reflected from or originating from the ground vehicle can be registered by an optical tracker mounted on the airborne platform. The multiple image frames can further be processed to determine the trajectory of the ground vehicle. A third example is an optical stellar tracking device, commonly known in the art as a star sensor or a star tracker. A star tracker determines the orientation of the spacecraft it is mounted on with respect to a known star field or star constellation. The accuracy with which the tasks outlined in these three examples are performed depends, at least in part, upon the accuracy of the optical tracking device used.

An improved optical tracking device and method of tracking the position of a light source have been disclosed in U.S. Pat. No. 8,045,178. The device disclosed is essentially a single axis tracking device because it uses one pair of gratings to shear the incoming light in one direction and is capable of improving tracking accuracy along that direction only. Along the axis that is perpendicular to the shearing direction, this single axis tracking device will have accuracy no greater than that of the coarse position estimate provided by the location of the image of the light source on the image plane. To increase tracking accuracy along two axes, the apparatus disclosed in U.S. Pat. No. 8,045,178 prescribes that two interferometric tracking devices be coupled together. The coupled arrangement could involve using two or more of the single axis interferometric tracking devices with their shearing axes oriented to coincide with the axes along which higher accuracy is desired. This would at least double the size and weight of the overall device. Using a single two-axis tracking device is more practical or desirable than using two single axis tracking devices for many applications. Such a two-axis tracking device is disclosed in U.S. Pat. No. 9,297,880, and even though it represents a significant improvement in both size and weight, improvements to the tracking accuracy are desirable.

SUMMARY OF THE INVENTION

The present invention is directed towards an interferometric tracking device and method of determining the relative position of a light source. The device and method are readily usable for two-axis tracking, the two axes being perpendicular to each other and enabling determination of a relative angular position of a light source imaged onto a focal plane array. In addition, the device and method advantageously reduce the impact of achromatic effects in the light source imaged onto the focal plane array, thereby improving the determination of the relative angular position of stars and objects of uncertain color.

In a first separate aspect of the present invention, an interferometric tracking device including: an optical cascade comprising a plurality of image dividers, each of the image dividers splitting incident light into a plurality of non-parallel orthogonally polarized beams, the plurality of image dividers including: an incident image divider receiving light into the optical cascade; one or more intermediary image dividers optically coupled to the incident image divider; and one or more exit image dividers, each exit image divider optically coupled to one of the intermediary image dividers; a plurality of pairs of shearing interferometers, each pair of the shearing interferometers being optically coupled between optically adjacent image dividers in the optical cascade; and one or more focal plane arrays, the orthogonally polarized beams from the one or more exit image dividers being imaged onto the one or more focal plane arrays.

In a second separate aspect of the present invention, a two-axis interferometric tracking device including: image dividers arranged to form an optical cascade, with one of the image dividers being an incident image divider for the optical cascade and one or more of the image dividers being one or more exit image dividers for the optical cascade, wherein each of the image dividers splits incident light into a plurality of non-parallel orthogonally polarized beams, and the beams from the incident image divider cascading through the other image dividers in the optical cascade; a plurality of pairs of shearing interferometers, one of the pairs of shearing interferometers being optically coupled between optically adjacent image dividers in the cascade; one or more focal plane arrays, the orthogonally polarized beams from the one or more exit image dividers being imaged onto the one or more focal plane arrays; at least one set of imaging optics configured to focus the orthogonally polarized beams from the one or more exit image dividers onto a spot on the one or more focal plane arrays; and a processor communicably coupled with the one or more focal plane arrays, the processor being configured to estimate a relative coarse position of a point source having light incident on the first image divider based on a center of a plurality of spots generated on the one or more focal plane arrays and to estimate a relative fine position of the point source based on relative intensities of the plurality of the spots on the one or more focal plane arrays.

In a third separate aspect of the present invention, a method of determining a position of a source of light includes: receiving light from the source into an aperture to generate an incident beam; splitting the light in each of a plurality of successive splitting stages, each splitting stage generating two non parallel beams as a beam pair from each of one or more input beams, wherein each beam of each beam pair has a linear polarization orthogonal to the linear polarization of the other beam of the beam pair; shearing the beams of each beam pair in a first pair of shearing interferometers along a first direction between a first pair of the plurality of successive stages; shearing the beams of each beam pair in a second pair of shearing interferometers along a second direction between a second pair of the plurality of successive stages; imaging the beams onto a plurality of spots on one or more focal plane arrays; estimating a relative coarse position of the source based on a position of the plurality of spots on the one or more focal plane arrays; and estimating a relative fine position of the source based on relative intensities of the plurality of spots on the one or more focal plane arrays.

Accordingly, an improved device and method a tracking device are disclosed. Advantages of the improvements will be apparent from the drawings and the description herein.

BRIEF DESCRIPTION OF THE DRAWINGS

The foregoing summary, as well as the following detailed description of the exemplary embodiments, will be better understood when read in conjunction with the appended drawings. It should be understood, however, that the invention is not limited to the precise arrangements and instrumentalities shown in the following figures.

DETAILED DESCRIPTION OF THE INVENTION

The term "point source" as used herein is defined as a source of light which can be considered as being effectively emitted from a single point. The following are examples of point sources, and are in no way intended to limit the definition:
 1. Parallel beams of light confined to a sufficiently small diameter, such as that emitted from most common tabletop lasers;
 2. Light emitted from a distant source, such as a star;
 3. Light from a diffuse light source reflected off an object, such as sunlight reflected off an orbiting body, e.g., a satellite or other space-based platform, when seen or detected at a significant distance;
 4. Light from a laser reflected off of an object or surface; and
 5. Light emitted from a diffuse light source passed through a pin hole.

The two-axis interferometric tracking device operation is based on the operating principles of a shearing interferometer, particularly those formed by a pair of gratings, such as is described in U.S. Pat. No. 9,297,880, the disclosure of which is incorporated herein by reference in it's entirety. Instead of having a single shearing interferometer placed in the optical path between optically adjacent image dividers in the optical cascade, a pair of shearing interferometers are placed in the optical path between optically adjacent image dividers, with the pair of shearing interferometers arranged to substantially cancel a phase shift dispersion in a beam passing through the pair of shearing interferometers. To do this, the shearing interferometers that form each pair of shearing interferometers are rotated 180 degrees about the optical axis to shear incident light 180 degrees out of phase with respect to each other. If this design is configured as described below, the achromatic phase shift with star or object color can be significantly reduced.

In certain embodiments, the two-axis interferometric tracking device includes a first pair of shearing interferometers and a second pair of shearing interferometers. Each shearing interferometer may be formed by a pair of gratings. Each grating pair, in turn, consists of two gratings in substantially angular alignment, separated by a spacer. Light incident on the first grating of a grating pair is diffracted by the first grating, which is constructed to provide strong +1 and −1 order diffractions, and little energies in the other orders. Each of these modes is further diffracted at the second grating of the grating pair. The resulting 0th order mode (1st order mode from first grating and the −1st order mode from the second grating, and vice versa) will produce an interference pattern which varies with the incidence angle of light incident on the first grating.

Each shearing interferometer of each pair of shearing interferometers is formed in this manner. The difference between the two shearing interferometers of each pair of shearing interferometers is that each has a different grating period and each has a different spacing between the two gratings. It is known that the achromatic phase shift from the gratings in a shearing interferometer is roughly proportional to (grating spacing)/(grating period)$^3$, and it is also known that an achromatic phase shift can result in some amount of achromatic dispersion. Advantageously, the nonlinear relationship between the achromatic phase shift and the grating period may be used to mitigate the impact of achromatic phase shift caused by the gratings in a shearing interferometer.

In view of this nonlinear relationship, the grating period of the gratings in the first shearing interferometer of a pair of shearing interferometers may be selected to be substantially different from the period of the gratings in the second interferometer of the pair of shearing interferometers. While this selection of grating periods may result in a slightly less sensitive tracking device, it has the advantage of significantly reducing the impact of achromatic phase shift during tracking. By way of example, if the period of the gratings used in the first shearing interferometer is 2× the period of the gratings used in the second shearing interferometer, and simultaneously the spacing between the two gratings in the second interferometer is made 8× smaller as compared to the first shearing interferometer, the achromatic effect from the second shearing interferometer will substantially cancel the achromatic effect from the first shearing interferometer so long as the second shearing interferometer is rotated approximately 180 degrees about the optical axis with respect to the first shearing interferometer so that the phase shift of the second shearing interferometer subtracts from the phase shift of the first shearing interferometer. As indicated above, the sensitivity of the pair of shearing interferometers will decrease by approximately 25%, and this decrease in sensitivity should be considered when setting the final design parameters.

While the rough guidelines of grating period and spacing discussed above are useful, it may be desirable to for a final design to use a high fidelity optical design program to set the final production values and achieve optimal achromatic performance. It should be recognized that many different combinations of grating period and grating spacing can substantially reduce achromatic behavior, and even higher levels of achromatic cancellation can be achieved using more than two interferometers.

In more general terms, in a pair of shearing interferometers, the grating period of the first shearing interferometer as compared to the second shearing interferometers of a pair of shearing interferometers will be greater by a factor, X, and the spacing between the gratings of the first shearing interferometer as compared to the second shearing interferometer will be greater by a factor of $X^3$. This will result in the two shearing interferometers imparting approximately the same achromatic phase shift on incident light, which will subtract if the second shearing interferometer is rotated 180 degrees with respect to the first shearing interferometer about the optical axis. In certain embodiments, the factor defining the respective spacing between gratings of each of the first and second shearing interferometers may be optimized to be slightly different than a factor of $X^3$.

By way of example, when visible light is incident on a pair of shearing interferometers, the first shearing interferometer has a grating period of 20 μm, and the second shearing interferometer has a grating period of 10 μm. Applying the factor described above for the spacing between the gratings, the spacing between the gratings in the second shearing interferometer is $1/8^{th}$ of the spacing between the gratings in the first shearing interferometer. Although, it can be found through simulation or experimentation that the optimal spacing between the gratings for the second shearing interferometer is 0.59% smaller as compared to the calculated using the factor alone.

With input from light in the visible band, for example ranging from 500 nm to 750 nm, across a 19×19 degree field of view, a single shearing interferometer might result in about 15 μrad achromatic phase dispersion across the visible band. However, when a pair of shearing interferometers is used, with one rotated 180 degrees relative to the other and with the aforementioned example grating periods and spacing between the gratings, the achromatic phase dispersion can be reduced to approximately 0.017 μrads, thereby rendering the undesirable effects of achromatic dispersion negligible.

Although the above example describes substantially eliminating the effects of achromatic dispersion in a visible band, the same technique may be applied to any band of light, including near infrared (NIR), short wave infrared (SWIR), midwave infrared (MWIR), and long wave infrared (LWIR) light, among others.

The inclusion of pairs of shearing interferometers within an optical cascade formed by a plurality of image dividers enables encoding the position of an input light source as a plurality of sinusoidally modulated intensities on a focal plane array (FPA), the phase of which measures the track angle with near perfect linearity, without any significant error being introduced due to achromatic dispersion. As the incidence angle of input light changes, the sinusoidal interference pattern shifts back and forth, depending on the direction of angular motion, and very precise angle motion can be sensed by the changes in the fringe phase. Furthermore, the phase of the interference pattern is nearly independent of the wavelength and is highly linear with respect to the incidence angle; with only a slight deviation due to the difference between the sine function and linear ramp which can be calibrated. The phase difference between the two interference signals is periodic with incident angle, the period of which may be referred to herein as the "angular period" and is wavelength independent. This angular period can be very small, and with phase sensitive detection providing $1/100$-$1/1000$ angular period detection, the tracking device can provide angular sensitivity of less than 500 nanoradians for a single point source using a single image frame.

Figure 1:
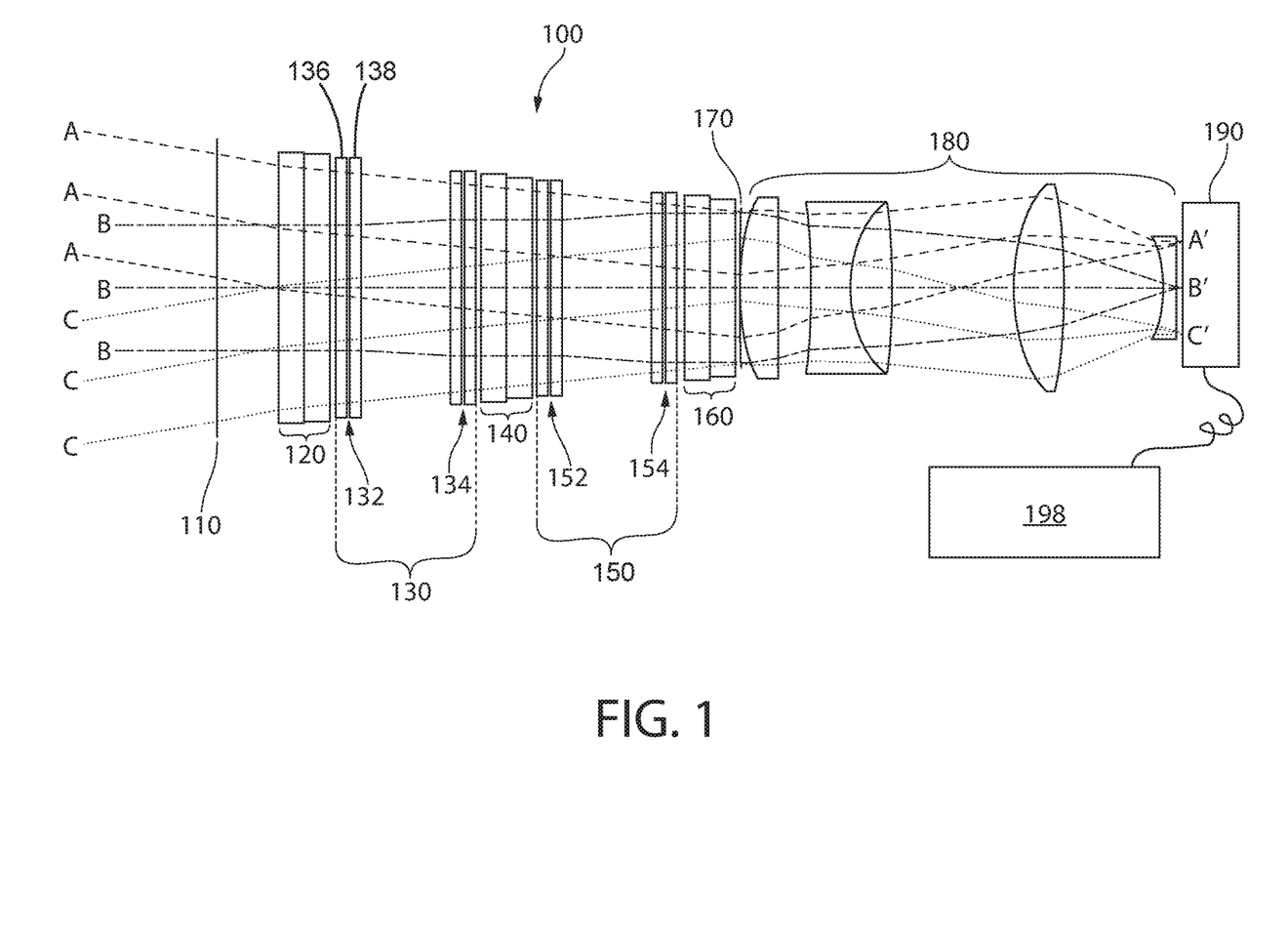
FIG. 1 schematically illustrates a two-axis interferometric tracking device with a single focal plane array (FPA)

The two-axis interferometric tracking device, described in more detail below, may be constructed by combining two pairs of shearing interferometers, with each pair of shearing interferometers providing a shear along orthogonal axes (e.g., one pair shearing along an X-axis and the other pair shearing along a Y-axis; or one pair shearing in a vertical direction with respect to an FPA, and the other pair shearing in a horizontal direction with respect to an FPA), with three Wollaston prisms serving as image dividers. Each Wollaston prism separates incoming light into two orthogonal linearly polarized beams of different directions. Incident light on a single Wollaston prism from a single light source is therefore imaged onto two spots. The three Wollaston prisms are placed in an optical cascade arrangement, such that one of the Wollaston prisms serves as an incident image divider for the optical cascade, and one of the prisms serves as an exit image divider for the optical cascade, so that eight spots are formed following the exit prism per light source with light incident on the incident image divider. One of the pairs of shearing interferometers is optically coupled between each optically adjacent image divider. For purposes of this description, two image dividers are optically adjacent if the pair are optically coupled and there are no other image dividers optically coupled between the pair. For example, with reference to FIG. 1A, prism 120 and prism 140 are optically coupled, but prism 120 and prism 160 are not.

The cascade arrangement may include additional image dividers, such that beams emerging from one image divider are directed into separate image dividers. Polarizing beam splitters may be substituted for Wollaston prisms in certain designs. Wollaston prisms and polarizing beam splitters both act as image dividers As explained above, each shearing interferometer is formed by a pair of gratings. Ronchi phase gratings are generally not a suitable type of grating due to their low light throughput. Instead, the following types of gratings are preferred:

1. Birefringent gratings constructed by filling the grooves of a blazed grating with liquid crystal and covering the filled blazed grating with a cover glass,
2. Liquid crystal polarization gratings (LCPG), which have been successfully manufactured by several companies using manufacturing processes such as those outlined in U.S. Pat. No. 8,358,400, and
3. Blazed gratings made of birefringent material, e.g., sapphire.

A one-axis interferometric tracking device may be constructed from the principles disclosed herein. Such a tracking device would include two image dividers with a single pair of shearing interferometers optically disposed between the two image dividers. In such an arrangement, four spots would be registered for each light source, with all four images being processed for tracking along a single axis.

Turning to the drawings, FIG. 1 illustrates a two-axis interferometric tracking device 100 which includes an aperture 110, three Wollaston prisms (image dividers) 120, 140, 160, two pairs of shearing interferometers 130, 150, an optical stop 170, imaging optics 180, a focal plane array 190, and a processor 198. The first pair of shearing interferometers 130 is optically disposed between the first Wollaston prism 120 and the second Wollaston prism 140, which are optically adjacent. The second pair of shearing interferometers 150 is optically disposed between the second Wollaston prism 140 and the third Wollaston prism 160, which are optically adjacent.

In certain embodiments, the aperture 110 may coincide with the surface of the first Wollaston prism 120. In certain embodiments, the optical stop 170 may be an optical artifact rather than an actual physical element. As previously indicated, each shearing interferometer 132, 134, 152, 154 of the pairs of shearing interferometers 130, 150 are formed by a pair of gratings 136, 138. In certain embodiments, the gratings 136, 138 are two flat gratings that are substantially parallel to each other and in contact with a spacer frame that may be formed of the same material as the two gratings. One suitable material for the gratings is fused silica. The grating pair and spacer frame can be bonded such that it expands and contracts as a uniform homogeneous unit. This is desirable since beam shear induced by the grating pair is proportional to the distance between the gratings divided by the period of the grating, and using the same material for the gratings and the spacer frame makes the beam shear invariant to the soak temperature fluctuations. In certain embodiments, the gratings 136, 138 can be formed as liquid crystal polarization gratings (LCPG).

Light incident on the aperture 110 is shown as beams originating from three point sources. In certain embodiments, one or more of the light sources may not be point sources. However point sources are used as part of this description for purposes of simplification. Beams A from the first point source produce an image A' on the focal plane array 190. Beams B from the second point source produce an image B' on the focal plane array 190. Beams C from the third point source produce an image C' on the focal plane array 190. The beams that originate from the same source are substantially parallel to one another due to the distance between the source and the aperture 110. Each image A', B', C' is a collection of eight spots, resulting from the optical components of the tracking device 100 optically disposed between the aperture 110 and the focal plane array 190. Refractive elements included as part of the imaging optics 180 help to collectively bring the beam images A', B', C' to a focus on the focal plane array 190.

The focal plane array 190 may be a two dimensional array of picture elements (pixels), each of which contains a detector that is sensitive to light in a specific spectral band. Most common FPAs that are widely available operate in the visible band, such as CCD and CMOS FPAs. Depending on the application, it may be desirable to use FPAs that are sensitive to NIR, SWIR, MWIR, or LWIR light.

The FPA 190 is communicably linked to a processor 198, which receives, stores and processes the image frames captured by the focal plane array 190 in a manner that is described in U.S. Pat. No. 9,297,880.

Figure 2:
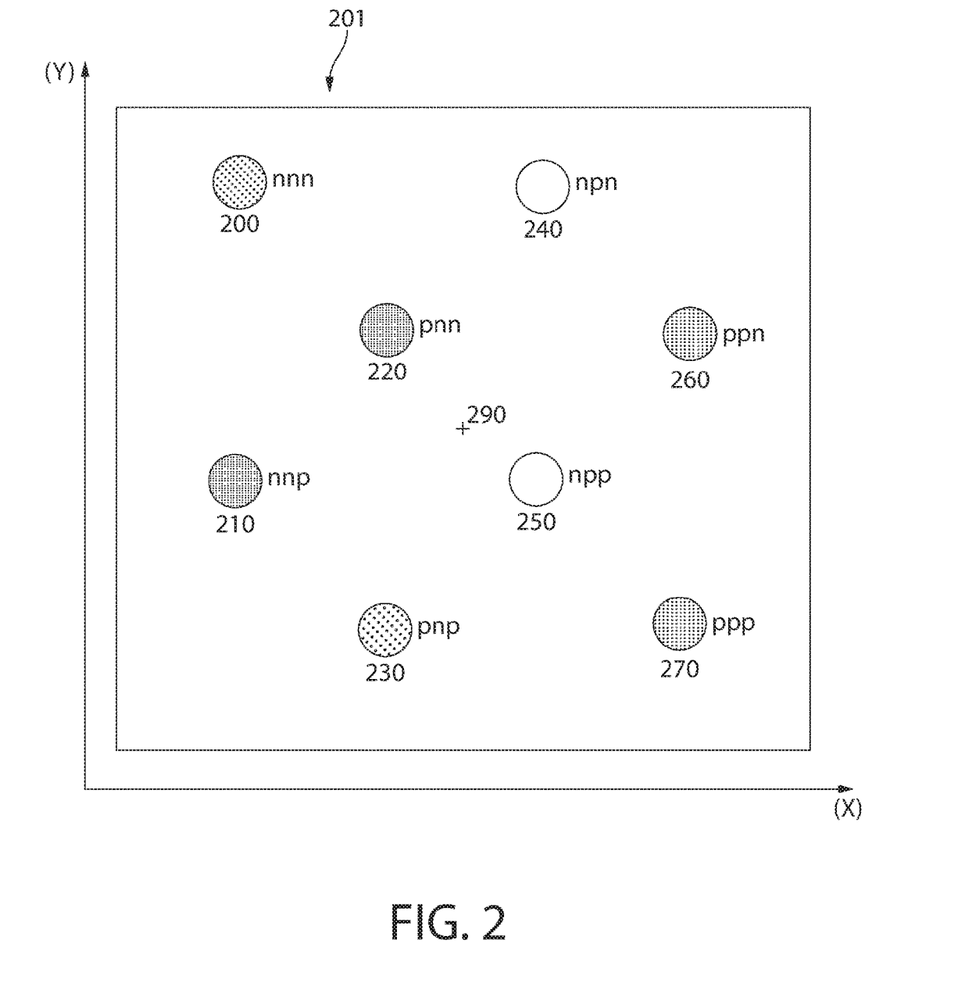
FIG. 2 illustrates a single light source imaged onto the FPA of the two-axis interferometric tracking device of FIG. 1.

Each image A', B', C' in FIG. 1 is a combination of eight spots on the FPA 190. FIG. 2 illustrates an exemplary arrangement of the eight spots 200-270 on the FPA 201. All eight spots 200-270 are generated from a single point source and can be labeled according to the direction in which they have been diverted by the three Wollaston prisms, each of which separates circularly polarized or unpolarized light into two orthogonal linearly polarized beams shifted in opposite directions. In the sensor design resulting in the eight spots shown in FIG. 2, the first Wollaston prism 120 has a 45 degree rotation from horizontal, the second Wollaston prism 140 has a 0 degree rotation from horizontal, and the third Wollaston prism 160 has a 90 degree rotation from horizontal. The direction of polarization may be indicated with letters p and n, with p representing positive deflection and n representing negative deflection from each Wollaston prism in a direction corresponding the respective angle of rotation.

With reference to FIG. 2, the beam spot 200 has been deflected three times in the n direction (once by each of the three Wollaston prisms 120, 140, 160), and therefore it is marked nnn. The beam spot 220 has been deflected first in the p direction (by the first Wollaston prism 120) and then twice in the n direction (once by each of the second and third Wollaston prisms 140, 160). This beam spot 220 is therefore marked pnn, and it is shown separated from the beam spot 200 only in the 45 degree direction. The beam spot 240 has been deflected first in the n direction (by the first Wollaston prism 120), then in the p direction (by the second Wollaston prism 140), then again in the n direction (by the third Wollaston prism 160). This beam spot 240 is therefore marked npn, and it is shown separated from the beam spot 200 only in the 0 degree direction. The beam spot 270 has been deflected three times in the p direction (once by each of the three Wollaston prisms 120, 140, 160). This beam spot 270 is therefore marked ppp, and it is shown separated from the beam spot 200 in each of the 0 degree direction, the 45 degree direction, and the 90 degree direction. Thus, it should be understood that beam spots can be labeled to show the order of the directions in which they have been diverted as they pass through the three Wollaston prisms, i.e., as ppp, ppn, pnp, pnn, npp, npn, nnp, and nnn. Using this convention, the eight spots 200-270 are denoted as ppp, ppn, pnp, pnn, npp, npn, nnp and nnn. Depending on the particular specifications and orientations of the Wollaston prisms 120, 140, 160, the eight spots can be arranged in a variety of patterns. As the point source moves across the field of view, the intensity of each of the spots fluctuates between a minimum and maximum intensity value.

The center of the eight spots 290 (labeled with "+") is the actual estimated position of the image which can be used to calculate a coarse estimate of the axial direction of the incident light from the imaged point source. The coarse position estimating process may start with a detection of the spots using thresholding or correlating or convolution or other suitable image or signal processing process.

A fine position estimate is obtained by further processing the registered intensities of the eight spots, which includes pairwise summing of intensities to obtain approximately quadrature signals for X and Y axis position calculations. This summing takes advantage of the sum of two Wollaston spots being constant even while the division of intensity between the two spots may vary. For the horizontal axis (X) from the first pair of shearing interferometers 130, the four quadrature signals are obtained by summing the intensities of the following pairs: ppn+ppp (260+270), pnn+pnp (220+230), npn+npp (240+250), and nnn+nnp (200+210). For the vertical axis (Y) from the second pair of shearing interferometers 150, the four quadrature signals are obtained by summing the intensities of the following pairs: ppn+pnn (260+220), ppp+pnp (270+230), nnp+npp (210+250) and nnn+npn (200+240).

The process of converting such a quadrature signal into a phase estimate is well understood by those skilled in the art. Accurate phase estimation depends upon knowing the exact X and Y phase shifts between the various signals, as well as the signal intensity and modulation level. All these parameters (relative phase, intensity and modulation level) vary for each spot as the point source moves across the field of view.

To improve performance, these parameters can be measured after construction of the interferometric tracking device 100 during a calibration procedure. The measurements can be compiled in a look-up table which can be referenced during track angle calculation. Similarly the relationship between signal phase and pixel location can also be calibrated so that the spot centroid can be used to determine the integer number of cycles to go along with the signal phase. The integer plus fraction phase is then calibrated to provide the absolute point source direction.

After calibration, the resulting phase estimate has been found to be substantially linear with angle of incidence (and hence the axial direction) of incoming light over a wide field of view and can be interpolated to better than a small fraction (e.g., ¹⁄₁₀₀₀th) of a cycle. Thus, the phase estimate is easily converted into a fine determination of the relative position of the point source with respect to the boresight of the tracking device or with respect to other points on the FPA or with respect to other point sources imaged on the FPA.

As the tracking device 100 is designed, the optical components can be specified such that the phase goes through one cycle per pixel on the FPA 190 and through approximately 500-2000 cycles across the full field of view of the two-axis interferometric tracking device 100. The number of phase cycles per pixel and the number of cycles across the entire field of view are a matter of design, and can be changed to suit the needs of the deployment environment.

The tracking device 100 may be built using parts that are inherently, or have been shown to be, radiation hardened or capable of operating in environments having a wide thermal range, e.g., between −65° C. to +65° C., or both. In addition, the tracking device 100 may be constructed such that it can accommodate operating at slew rates, e.g., 2 deg/sec. Depending upon the design particulars of the tracking device 100, the field of view, slew rate, accuracy, and radiation exposure, capabilities of the tracking device 100 may be different, larger or smaller.

The tracking device 100 is capable of tracking any desired number of point sources within its field of view. The multiple point sources may correspond to a star field, consisting of multiple stars, or a number of spacecraft, or a number of objects of interest.

In certain embodiments, the processor 198 may be integrated with the FPA 190, or alternately, the processor 198 may be an external processor which is operationally coupled to the FPA 190. In either case the processor 198 may be programmed to receive output signals from the FPA 190, to estimate a relative coarse position of the light source from centroids of the eight spots on the FPA 190, and to estimate a relative fine angular position of the light source from relative intensities of the eight spots on the FPA 190. Fine angular position estimates for a two-axis interferometric tracking device where the two axes are configured to be perpendicular (i.e., a horizontal (X) axis and a vertical (Y) axis) will result in a fine angular position estimate along the X-axis and a fine angular position estimate along the Y-axis.

The relative coarse position and the relative fine position, respectively, are determined from an estimated a coarse angle of incidence and a fine angle of incidence for each individual point source within the field of view of the tracking device 100. The angle of incidence, once obtained, is then used to determine the position of the point source within the field of view of the interferometric tracking device 100, and thereby the relative position of the point source to the tracking device 100, the platform, the boresight of the tracking device 100, or relative to other points on the FPA 190 or other point sources imaged on the FPA 190. The coarse angle of incidence is determined by estimating the centroid of the eight spots generated by a point source on the FPA 190. If the FPA 190 includes 512×512 pixels, the centroid position can be smaller than a single pixel area on the FPA, meaning that the position of the centroid within the pixel can be determined to within limited amount of accuracy from the position of the eight spots on the FPA. However, since the pairwise summation of the eight spots results in four quadrature signals each for horizontal and vertical position, which in turn provide a fine determination of the angle of incidence, no blurring of the image is necessary to increase accuracy.

Figure 3:
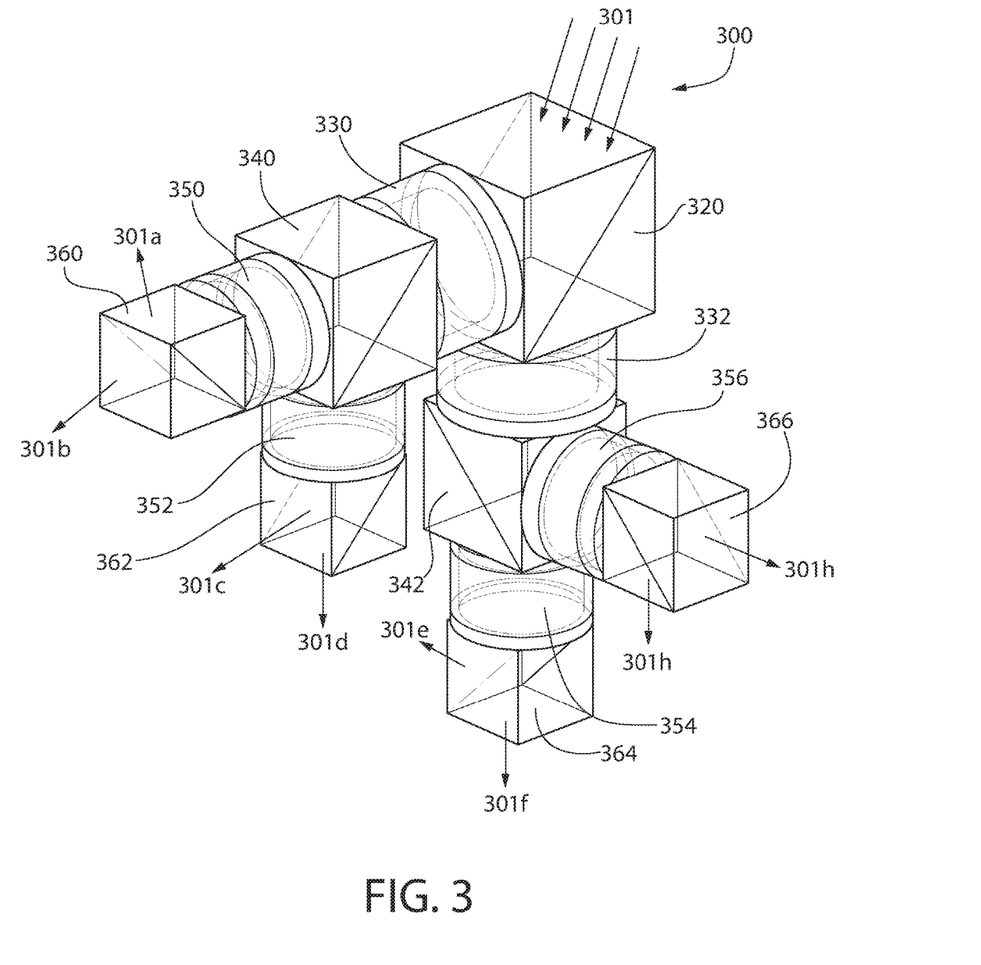
FIG. 3 illustrates a two-axis interferometric tracking device with eight focal plane arrays.

The optical cascade of an alternative embodiment of a two-axis interferometric tracking device 300 is illustrated in FIG. 3. The imaging optics and FPAs have been omitted in FIG. 3 for ease of illustration and purposes of clarity. In tracking device 300, the Wollaston prisms are replaced by polarizing beam splitters, which like Wollaston prisms, serve as linearly polarizing image dividers. The rays 301 from a point source travel through beam splitter 320 and diverge onto two paths, one of which passes through a first pair of shearing interferometers 330 while the other passes through a second pair of shearing interferometers 332. Each ray of the two ray bundles is further split into two by the beam splitters 340 and 342.

The ray bundle that emerges from the beam splitter 340 travels through a third pair of shearing interferometers 350, and the other ray bundle that emerges from the beam splitter 340 travels through a fourth pair of shearing interferometers 352. Each ray bundle emerging from the pairs of shearing interferometers 350, 352 is further split, respectively, by one of two beam splitters 360, 362. Two ray bundles 301a, 301b emerge from the beam splitter 360 traveling in divergent directions, and two ray bundles 301c, 301d emerge from the beam splitter 362 traveling in divergent directions.

The ray bundle that emerges from the beam splitter 342 travels through a fifth pair of shearing interferometers 354, and the other ray bundle that emerges from the beam splitter 342 travels through a sixth pair of shearing interferometers 356. Each ray bundle emerging from the pairs of shearing interferometers 354, 356 is further split, respectively, by one of two beam splitters 364, 366. Two ray bundles 301e, 301f emerge from the beam splitter 364 traveling in divergent directions, and two ray bundles 301g, 301h emerge from the beam splitter 366 traveling in divergent directions.

The beam splitters 320, 340, 342, 360, 362, 364, and 366 separate randomly polarized or unpolarized light into two orthogonal linearly polarized beams. At the same time, the pairs of shearing interferometers 330, 332, 350, 352, 354, and 356 shear the incident beams. Consequently, the optical elements shown in FIG. 3 are roughly equivalent to the optical components to the left of the optical stop 170 in FIG. 1A. However, each of the eight spots that are generated by the optical components shown in FIG. 3 may be imaged onto eight separate FPAs by focusing each of the ray bundles 301a, 301b, 301c, 301d, 301e, 301f, 301g, and 301h through eight sets of imaging optics.

Figure 4:
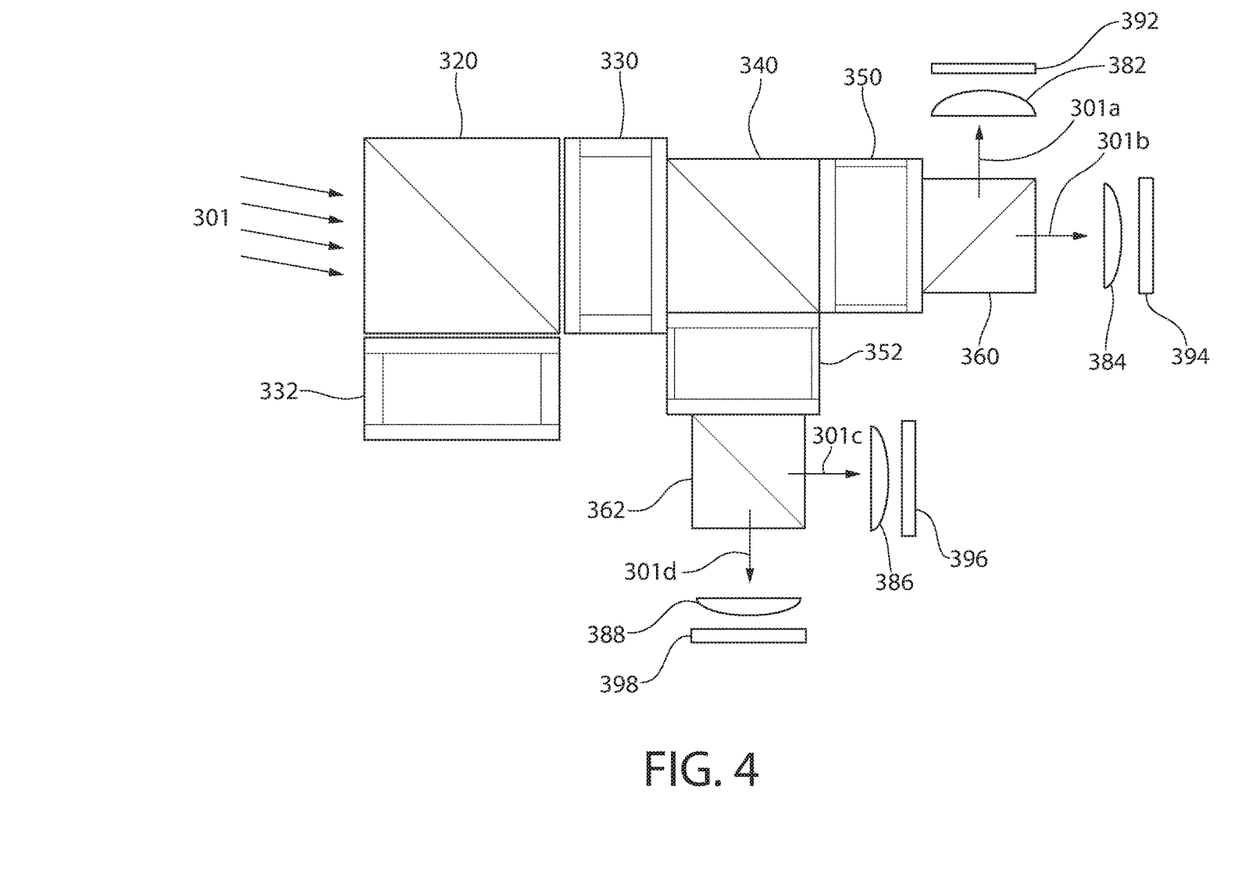
FIG. 4 illustrates part of the two-axis interferometric tracking device shown in FIG. 3.

FIG. 4 schematically illustrates part of two-axis interferometric tracking device 300 of FIG. 3. Only four imaging optics and FPAs are shown. The remaining four imaging optics and FPAs, as well as three additional beam splitters and two pairs of shearing interferometers, are not shown for ease of illustration. The rays 301 from a point source travel through beam splitter 320, which splits the beams along divergent paths. One of the paths passes through the first pair of shearing interferometers 330 and the other path passes through the second pair of shearing interferometers 332. The rays that pass through the first pair of shearing interferometers 330 are split again by the beam splitter 340. One ray bundle travels through the third pair of shearing interferometers 350 and the other ray bundle travels through the fourth pair of shearing interferometers 352. The ray bundle that travels through the third pair of shearing interferometers 350 is again split into two ray bundles 301a, 301b by the beam splitter 360. The two ray bundles 301a, 301b emerge from the beam splitter 360 traveling along divergent paths. The ray bundle 301a is focused by the imaging optic 382 onto FPA 392. The ray bundle 301b is focused by the imaging optic 384 onto FPA 394. The ray bundle that travels through the fourth pair of shearing interferometers 352 is again split into two ray bundles 301c, 301d by the beam splitter 362 traveling along divergent paths. The ray bundle 301c is focused by the imaging optic 386 onto FPA 396. The ray bundle 301d is focused by the imaging optic 388 onto FPA 398.

Each of the FPAs 392, 394, 396, 398 contain only one single spot of the complete image of the point source that produces the incident rays 301. The complete image (comprising eight spots) of the point source is thus distributed between the eight FPAs (only four of which are shown in FIG. 4). The spot registered on each of the FPAs 392, 394, 396, 398 correspond to the ray bundles 301a, 301b, 301c, and 301d, respectively. Likewise, an imaging optic and an FPA can be coupled to each of the surfaces of the beam splitters 364, 366 (shown in FIG. 3) out of which ray bundles 301e, 301f, 301g, and 301h emerge, producing four more spots. Together with the four spots on FPAs 392, 394, 396, and 398, the total number of spots will be eight. The eight spots on the eight separate FPAs are equivalent to the eight spots on one FPA which are shown in FIG. 2.

The tracking device 300 includes more parts and therefore is likely to be more costly and heavier than the tracking device 100 in FIG. 1A. However, the tracking device 300 offers several advantages over the two-axis interferometric tracking device 100. One advantage is that two point sources that are too close to be distinguished using the two-axis interferometric tracking device 100 because their multiple spots overlap on the single FPA 190 may become distinguishable using the alternate embodiment 300 since each FPA contains only one image of each point source. Another advantage is increased signal to noise ratio, especially in cases where the background intensity level is high compared to the point source intensity, for example when one is trying to register and track stars or spacecraft from the ground or from an airborne platform during daytime. The tracking device 300 divides the background illumination into eight FPAs whereas the tracking device 100 captures the background in a single FPA 190.

Figure 5A:
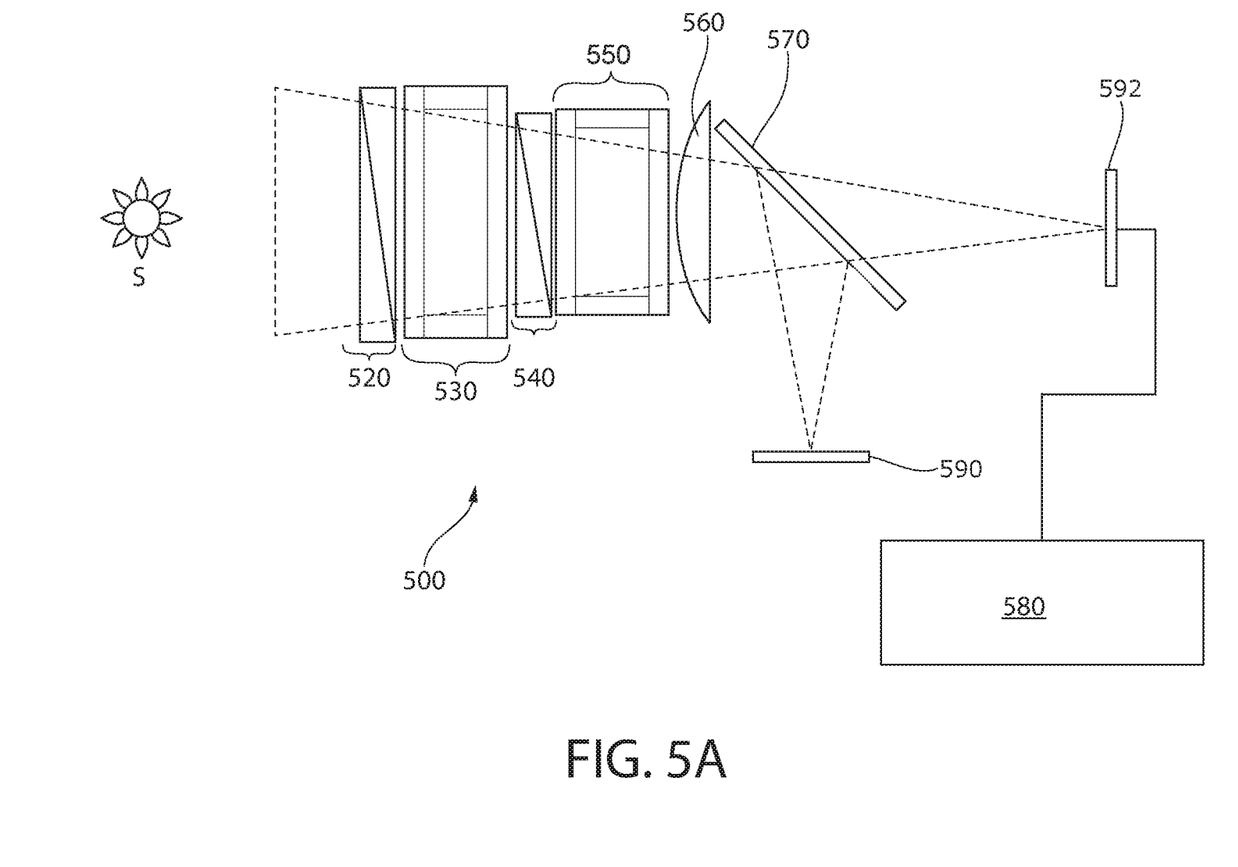
FIG. 5A schematically illustrates a two-axis interferometric tracking device with two FPAs.

A two-axis interferometric tracking device 500 with two FPAs is schematically illustrated in FIG. 5A. The device is suitable for detecting and tracking dim objects against various background levels, for example, for detecting space objects from the ground against the daytime or night sky. The tracking device 500 includes two FPAs 590, 592, a polarizing beam splitter 570, a lens 560, two pairs of shearing interferometers 530, 550, and two Wollaston prisms 520, 540. The shearing interferometers of each pair of shearing interferometers 530, 550 are formed by grating pairs. The Wollaston prisms 520, 540 may be built into the surfaces of the grating they optically precede.

Both FPAs 590, 592 are operationally coupled to the processor 580 which receives, stores and processes output image frames from the FPAs 590, 592. The FPAs 590, 592 may be configured to image objects in the SWIR band when viewing space objects against a bright sky background, e.g., during daytime. The spectral band of light that is processed by the tracking device 500 may be limited by inserting spectral filters inside the tracking device 500 or by selecting FPAs that are sensitive to the desired spectral band.

Figure 5B:
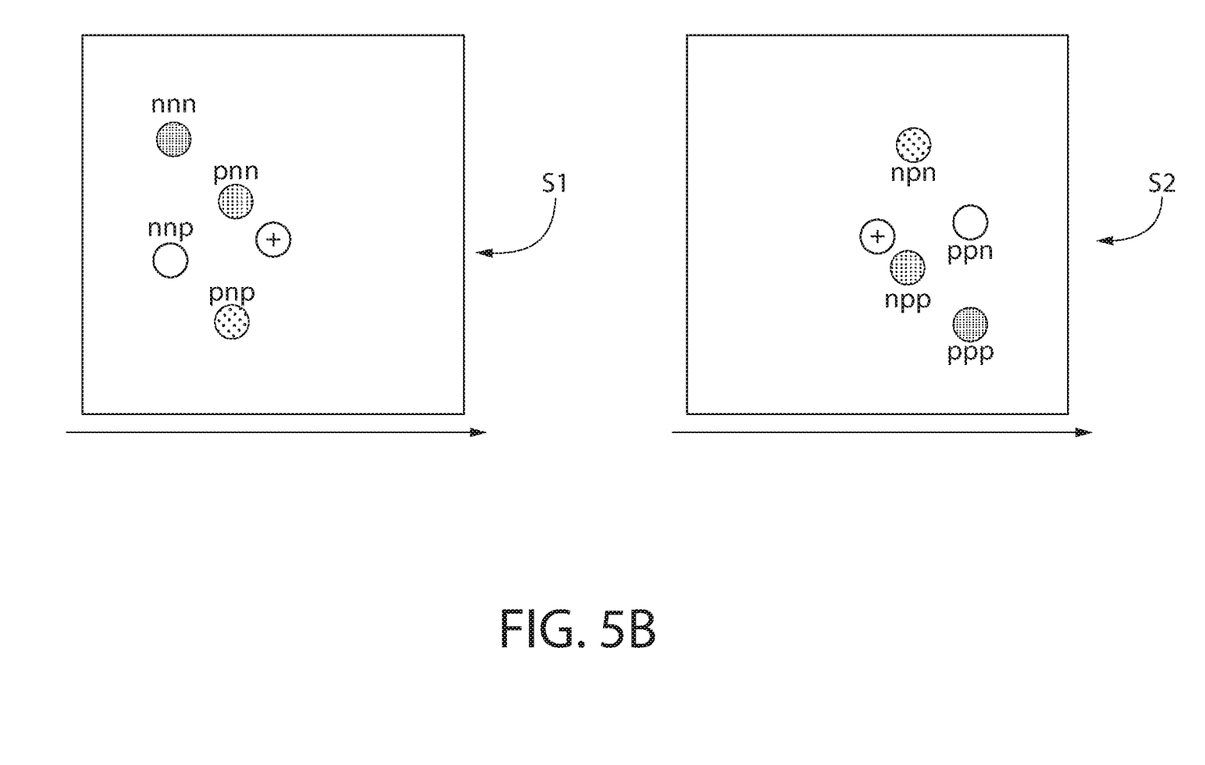
FIG. 5B illustrates a single distant light source imaged onto the two FPAs of the two-axis interferometric tracking device of FIG. 5A.

Collimated light from a distant light source S that is incident on the first Wollaston prism 520 is imaged on both FPAs 590, 592. The image includes: four spots formed on the plane S1 of the first FPA 590; and four spots formed on the plane S2 of on the second FPA 592. Both sets of four spots are illustrated in FIG. 5B. The eight spots imaged onto the two FPAs 590, 592 may be labeled according to the direction in which they have been diverted by the Wollaston prisms 520, 540 and by the polarizing beam splitter 570. Following this convention, the eight spots have been denoted as ppp, ppn, pnp, pnn, npp, npn, nnp and nnn. Depending on the particular specifications and orientation of the Wollaston prisms 520, 540 and by the polarizing beam splitter 570, these spots can be arranged in a variety of patterns. As the point source moves across the field of view, the intensity of each of the spots fluctuates between a minimum and maximum intensity value.

The coarse position estimating for the light source process may start with a detection of the spots using thresholding or correlating or convolution or other suitable image or signal processing method. If all eight spots were on a single FPA, the centroid of the eight spots may be used to calculate a coarse position estimate. However since the eight spots are distributed across two FPAs 590, 592, the optical alignment between the FPAs must first be determined. This process may also involve a calibration step which uses a light source having a very accurately known position. Once the FPA's are aligned through calibration, the eight spots can be combined on a virtual single FPA plane. In FIG. 5B the center of the eight spots (labeled with "+" inside a circle) is the actual estimated centroid of the eight spots after such alignment. Therefore, the position marked with "+" also corresponds to the coarse estimate of the axial direction of the incident light from the imaged point source.

A fine position estimate is obtained by further processing the registered intensities of the eight spots in the same manner described above for a single FPA.

Figure 6A:
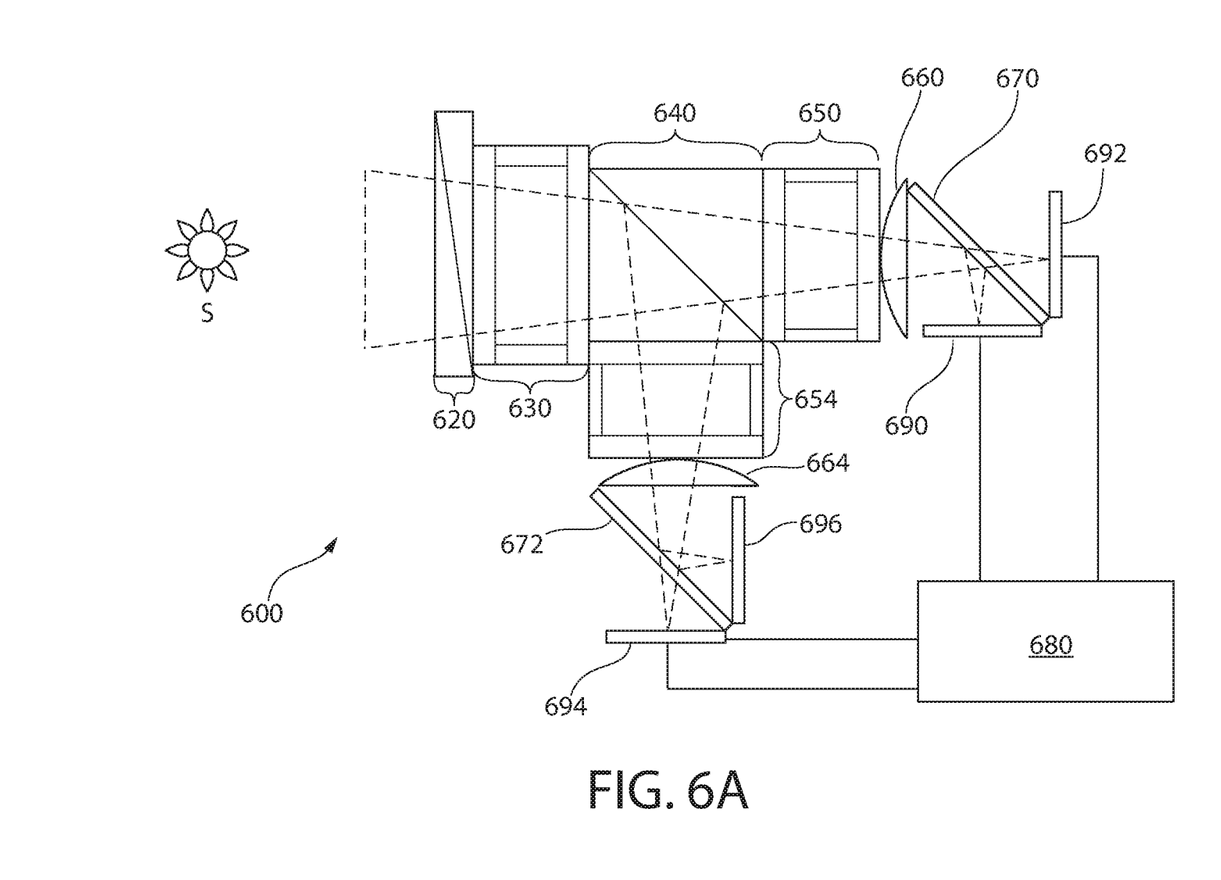
FIG. 6A schematically illustrates a two-axis interferometric tracking device with four FPAs.

A two-axis interferometric tracking device 600 with four FPAs is schematically illustrated in FIG. 6A. The device is suitable for detecting and tracking dim objects against various background levels, for example, for detecting space objects from the ground against the daytime or night sky. Using more FPAs increases the signal to background ratio per FPA since the background light gets distributed between multiple FPAs.

The tracking device 600 includes four FPAs 690, 692, 694, 696, all operationally coupled to the processor 680, which receives, stores, and processes the output image frames from the FPAs 690, 692, 694, 696, three polarizing beam splitters 640, 670, 672, two lenses 660, 664, three pairs of shearing interferometers 630, 650, 654, and a Wollaston prism 620. Each shearing interferometer in each pair of shearing interferometers 630, 650, 654 is formed by a grating pair. The Wollaston prism 620 may be built into the surface of the grating in the first shearing interferometer of the first pair of shearing interferometers 630. The FPAs may be configured to image light in the SWIR band (e.g., using InGaAs FPAs) when viewing space objects against a bright sky background, e.g., during daytime. In other embodiments, the FPAs may be configured to image light in other wave bands.

Figure 6B:
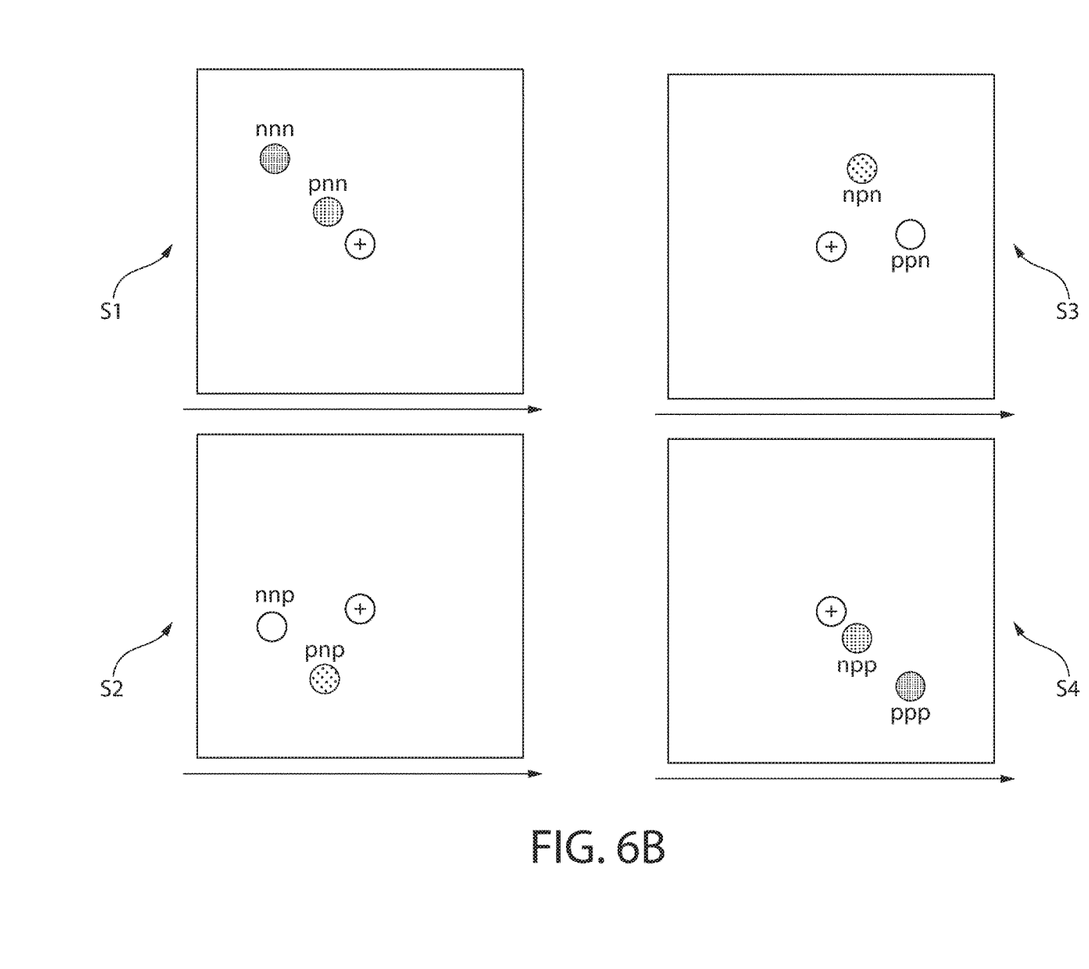
FIG. 6B illustrates a single distant light source imaged onto the four FPAs of the two-axis interferometric tracking device of FIG. 6A.

Through the optical cascade, collimated light from a distant light source S that is incident on the Wollaston prism 620 is imaged on all four FPAs 690, 692, 694, 696. FIG. 6B illustrates the arrangement of spots per FPA. The image includes: two spots on the plane S1 of the first FPA 690; two spots on the plane S2 of the second FPA 692; two spots on the plane S3 of the third FPA 694; and two spots on the plane S4 of the fourth FPA 696. These eight spots can be labeled according to the direction in which they have been diverted by the Wollaston prism 620 and the three polarizing beam splitters 640, 670, 674. Following this convention, the spots have been denoted as ppp, ppn, pnp, pnn, npp, npn, nnp and nnn. Depending on the particular specifications and orientation of the optical components, these spots can be arranged in a variety of patterns. As the point source moves across the field of view, the intensity of each of the spots fluctuates between a minimum and maximum intensity value.

The coarse position estimating for the light source process may start with a detection of the spots using thresholding or correlating or convolution or other suitable image or signal processing method. If all eight spots were on a single FPA, the centroid of the eight spots may be used to calculate a coarse position estimate. However since the eight spots are distributed across four FPAs 690, 692, 694 and 696, the optical alignment between the FPAs must first be determined. This process may also involve a calibration step which uses a light source having a very accurately known position. Once the FPA's are aligned, the eight spots can be combined on a virtual single FPA plane. In FIG. 6B the center of the eight spots (labeled with "+" inside a circle) is the actual estimated centroid of the eight spots after such alignment. Therefore, the position marked with "+" also corresponds to the coarse estimate of the axial direction of the incident light from the imaged point source.

A fine position estimate is obtained by further processing the registered intensities of the eight spots in the same manner described above for a single FPA.

The two-axis interferometric tracking devices disclosed herein are capable of tracking multiple distant light sources within their field of view. The multiple point sources may correspond to stars in a star field, or a number of spacecraft, or a number of objects of interest, or a combination thereof.

Sensitivity of the interferometric tracking devices are generally a function of their input aperture area and field of view. In general terms, larger apertures allow more light in whereas smaller fields of view limit the background light. Hence optically coupling an interferometric tracking device to a telescope with a large input aperture and limited field of view is often desirable. This can be accomplished by routing the light captured by the telescope to be incident upon the first optical element of the tracking device.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

What is claimed is:

1. An interferometric tracking device comprising:
   an optical cascade comprising a plurality of image dividers, each of the image dividers splitting incident light into a plurality of non-parallel orthogonally polarized beams, the plurality of image dividers comprising:
      an incident image divider receiving light into the optical cascade;
      one or more intermediary image dividers optically coupled to the incident image divider; and
      one or more exit image dividers, each exit image divider optically coupled to one of the intermediary image dividers;
   a plurality of pairs of shearing interferometers, each pair of the shearing interferometers being optically coupled between optically adjacent image dividers in the optical cascade; and
   one or more focal plane arrays, the orthogonally polarized beams from the one or more exit image dividers being imaged onto the one or more focal plane arrays.

2. The device of claim 1, wherein the plurality of pairs of shearing interferometers includes a first pair of shearing interferometers and a second pair of shearing interferometers, each of the first and second pairs of shearing interferometers configured to shear incident light along a direction substantially orthogonal to a shearing direction of the other of the first and second pairs of shearing interferometers.

3. The device of claim 1, wherein the plurality of pairs of shearing interferometers includes a first pair of shearing interferometers and a second pair of shearing interferometers, the first pair of shearing interferometers configured to shear incident light horizontally with respect to the one or more focal plane arrays, and the second pair of shearing interferometers configured to shear incident light vertically with respect to the one or more focal plane arrays.

4. The device of claim 1, wherein each pair of shearing interferometers comprises a first shearing interferometer and a second shearing interferometer, wherein the second shearing interferometer is positioned to substantially cancel a phase shift dispersion of the first shearing interferometer.

5. The device of claim 1, wherein each pair of shearing interferometers comprises a first shearing interferometer and a second shearing interferometer, wherein the second shearing interferometer is positioned to shear incident light 180 degrees out of phase as compared to the first shearing interferometer.

6. The device of claim 1, wherein at least one of the image dividers comprises a Wollaston prism.

7. The device of claim 1, wherein at least one of the image dividers comprises a polarizing beam splitter.

8. The device of claim 1, wherein each shearing interferometer comprises
   a first grating; and
   a second grating optically coupled to the first grating.

9. The device of claim 1, further comprising at least one set of imaging optics configured to focus the orthogonally polarized beams from the one or more exit image dividers onto a spot on the one or more focal plane arrays.

10. The device of claim 1, further comprising a processor communicably coupled with the one or more focal plane arrays, the processor being configured to estimate a relative coarse position of a point source having light incident on the first image divider based on a center of a plurality of spots generated on the one or more focal plane arrays and to estimate a relative fine position of the point source based on relative intensities of the plurality of the spots on the one or more focal plane arrays.

11. A two-axis interferometric tracking device comprising:
image dividers arranged to form an optical cascade, with one of the image dividers being an incident image divider for the optical cascade and one or more of the image dividers being one or more exit image dividers for the optical cascade, wherein each of the image dividers splits incident light into a plurality of non-parallel orthogonally polarized beams, and the beams from the incident image divider cascading through the other image dividers in the optical cascade;
a plurality of pairs of shearing interferometers, one of the pairs of shearing interferometers being optically coupled between optically adjacent image dividers in the cascade;
one or more focal plane arrays, the orthogonally polarized beams from the one or more exit image dividers being imaged onto the one or more focal plane arrays;
at least one set of imaging optics configured to focus the orthogonally polarized beams from the one or more exit image dividers onto a spot on the one or more focal plane arrays; and
a processor communicably coupled with the one or more focal plane arrays, the processor being configured to estimate a relative coarse position of a point source having light incident on the first image divider based on a center of a plurality of spots generated on the one or more focal plane arrays and to estimate a relative fine position of the point source based on relative intensities of the plurality of the spots on the one or more focal plane arrays.

12. The device of claim 11, wherein the plurality of pairs of shearing interferometers includes a first pair of shearing interferometers and a second pair of shearing interferometers, each of the first and second pairs of shearing interferometers configured to shear incident light along a direction substantially orthogonal to a shearing direction of the other of the first and second pairs of shearing interferometers.

13. The device of claim 11, wherein the plurality of pairs of shearing interferometers includes a first pair of shearing interferometers and a second pair of shearing interferometers, the first pair of shearing interferometers configured to shear incident light horizontally with respect to the one or more focal plane arrays, and the second pair of shearing interferometers configured to shear incident light vertically with respect to the one or more focal plane arrays.

14. The device of claim 11, wherein each pair of shearing interferometers comprises a first shearing interferometer and a second shearing interferometer, wherein the second shearing interferometer is positioned to substantially cancel a phase shift dispersion of the first shearing interferometer.

15. The device of claim 11, wherein each pair of shearing interferometers comprises a first shearing interferometer and a second shearing interferometer, wherein the second shearing interferometer is positioned to shear incident light 180 degrees out of phase as compared to the first shearing interferometer.

16. The device of claim 11, wherein at least one of the image dividers comprises a Wollaston prism.

17. The device of claim 11, wherein at least one of the image dividers comprises a polarizing beam splitter.

18. The device of claim 11, wherein the shearing interferometer comprises
a first grating; and
a second grating optically coupled to the first grating.

19. A method of determining a position of a source of light, the method comprising:
receiving light from the source into an aperture to generate an incident beam;
splitting the light in each of a plurality of successive splitting stages, each splitting stage generating two non parallel beams as a beam pair from each of one or more input beams, wherein each beam of each beam pair has a linear polarization orthogonal to the linear polarization of the other beam of the beam pair;
shearing the beams of each beam pair in a first pair of shearing interferometers along a first direction between a first pair of the plurality of successive stages;
shearing the beams of each beam pair in a second pair of shearing interferometers along a second direction between a second pair of the plurality of successive stages;
imaging the beams onto a plurality of spots on one or more focal plane arrays;
estimating a relative coarse position of the source based on a position of the plurality of spots on the one or more focal plane arrays; and
estimating a relative fine position of the source based on relative intensities of the plurality of spots on the one or more focal plane arrays.

20. The method of claim 19, wherein the first pair of shearing interferometers are configured to shear incident light along a direction substantially orthogonal to a shearing direction of the second pair of shearing interferometers.

21. The method of claim 19, wherein the first pair of shearing interferometers are configured to shear incident light horizontally with respect to the one or more focal plane arrays, and the second pair of shearing interferometers are configured to shear incident light vertically with respect to the one or more focal plane arrays.

22. The method of claim 19, wherein each pair of shearing interferometers comprises a first shearing interferometer and a second shearing interferometer, wherein the second shearing interferometer is positioned to substantially cancel a phase shift dispersion of the first shearing interferometer.

23. The method of claim 19, wherein each pair of shearing interferometers comprises a first shearing interferometer and a second shearing interferometer, wherein the second shearing interferometer is positioned to shear incident light 180 degrees out of phase as compared to the first shearing interferometer.

24. The method of claim 19, wherein estimating the relative coarse position includes determining an angle of incidence of the light from the source relative to one of the aperture, a boresight of the one or more focal plane arrays, a position on the one or more focal plane arrays, and a relative position on the one or more focal plane arrays with respect to other sources imaged on the one or more focal plane arrays.

25. The method of claim 19, wherein estimating the relative fine position includes determining an angle of incidence of the light from the source relative to one of the aperture, a boresight of the one or more focal plane arrays, a position on the one or more focal plane arrays, and a relative position on the one or more focal plane arrays with respect to other sources imaged on the one or more focal plane array.

26. The method of claim 19, further comprising tracking relative movement of the source from successive estimates of the relative coarse position and the relative fine position.

\* \* \* \* \*